United States Patent
Chen

(10) Patent No.: US 8,800,367 B2
(45) Date of Patent: Aug. 12, 2014

(54) SENSOR MODULE FOR BICYCLE

(75) Inventor: Tong-Pie Chen, New Taipei (TW)

(73) Assignee: Zentan Technology Co., Ltd., New Taipei (TW)

( * ) Notice: Subject to any disclaimer, the term of this patent is extended or adjusted under 35 U.S.C. 154(b) by 320 days.

(21) Appl. No.: 13/354,474

(22) Filed: Jan. 20, 2012

(65) Prior Publication Data

US 2013/0099045 A1    Apr. 25, 2013

(30) Foreign Application Priority Data

Oct. 19, 2011    (TW) .............................. 100219477 U

(51) Int. Cl.
*B65H 75/44*    (2006.01)
*B62J 99/00*    (2009.01)

(52) U.S. Cl.
CPC ............ *B62J 99/00* (2013.01); *B62J 2099/002* (2013.01); *B62K 2207/00* (2013.01)
USPC ................. 73/431; 73/866.5; 73/488; 73/494

(58) Field of Classification Search
USPC ................................................ 73/431, 866.5
See application file for complete search history.

(56) References Cited

U.S. PATENT DOCUMENTS

| | | | | |
|---|---|---|---|---|
| 4,633,216 | A | * | 12/1986 | Tsuyama ...................... 340/432 |
| 7,523,629 | B2 | * | 4/2009 | Tollefson .......................... 70/49 |
| 7,527,534 | B1 | * | 5/2009 | Cheng ............................ 439/770 |
| 7,878,521 | B2 | * | 2/2011 | Blomme et al. ........... 280/281.1 |
| 2006/0286861 | A1 | * | 12/2006 | Avevor et al. ................. 439/501 |
| 2012/0176005 | A1 | * | 7/2012 | Pedersen ..................... 310/67 R |
| 2012/0199688 | A1 | * | 8/2012 | Conaway ................... 242/610.5 |

* cited by examiner

*Primary Examiner* — Hezron E Williams
*Assistant Examiner* — Alexander Mercado
(74) *Attorney, Agent, or Firm* — Li & Cai Intellectual Property (USA) Office

(57) ABSTRACT

A sensor module for mounting on a rear fork of a bicycle includes a housing, a spool piece, a spool cap, and a sensing element. A switch member is arranged on one end of the housing, while a mounting seat is recessed on another end thereof. The spool piece is received by the mounting seat. The spool cap is arranged on the edge portion of the mounting seat. The sensing element is connected to the spool piece by a cable. The cable can be rewound into the spool piece. The distance between the sensing element and the housing is adjustable by extending or retracting the cable. The adjustability allows the sensor module to be adoptable by bicycles with different wheel sizes and rear fork structures. Accordingly, various cycling parameters can be measured.

8 Claims, 5 Drawing Sheets

US 8,800,367 B2

SENSOR MODULE FOR BICYCLE

BACKGROUND OF THE INVENTION

1. Field of the Invention

The instant disclosure relates to a sensor module; in particular, to a sensor module capable of measuring the traveling speed, pedaling efficiency, and the like of a bicycle.

2. Description of Related Art

Conventionally, sensor modules for bicycles are mounted onto either the front fork or rear fork of a bicycle frame. A magnet is usually attached to a wheel spoke. When riding the bicycle, the sensor module on the bicycle frame can pick up a bike's wheel rotation. The reading is used to measure parameters such as bike speed, distance traveled on a bike, pedaling speed/efficiency, etc.

The conventional sensor module, particularly to those mounted on the rear forks of the bicycles, generally includes two magnetic reed switches. One of the switch measures the pedaling efficiency, while the other switch reads the wheel rotations. To interact with the magnet on the crank arm of the pedaling pad, one of the reed switches has to be mounted at a predetermined position on the rear fork. Whereas for the wheel spoke, to maintain proper magnet-switch interaction, the distance between the other reed switch and the spoke-mounted magnet must constantly be adjusted. Thus, the existing sensor module lacks convenience quality. In addition, since the bike wheels and rear forks come in different types and sizes, the conventional modules may not have sufficient adjustment available.

For an alternative sensor module, one magnetic reed switch is used to measure the pedaling efficiency, while the other magnetic reed switch is cabled to the bicycle frame. Such configuration is applicable to bicycles with different wheel sizes. However, when the magnetic reed switches are mounted on the rear fork, the excess cable may dangle from the bicycle and must be bundled up. Over a period of time, the electric wires inside the cable may become damaged. The cable bundled to the rear fork is also less aesthetically appealing.

To address the above issues, the inventor strives via industrial experience and academic research to present the instant disclosure, which can effectively improve the limitations described above.

SUMMARY OF THE INVENTION

The object of the instant disclosure is to provide a sensor module for bicycles. The sensor module utilizes a roll-up type sensing element adaptable to bicycles with different wheel sizes and rear forks. Various cycling parameters may thus be obtained.

Another object of the instant disclosure is to provide a sensor module. In particular, a retaining structure of the module can prevent a connecting cable of the sensing element from retracting accidentally into a housing of the module. Thereby, the length of the exposed portion of the cable may be effectively controlled to maintain aesthetic appeal.

The sensor module of the instant disclosure, for mounting to a rear fork of the bicycle, comprises: a housing having an opposite first end and a second end, where a switch member is arranged on the first end and a mounting seat is recessed on the second end, with the mounting seat having a retaining structure, where the retaining structure has a plurality of retaining holes formed thereon; a spool piece received by the mounting seat, where the spool piece has at least one protrusion for engaging the retaining holes; a spool cap having an opening formed thereon in accordance to the spool piece, where the spool cap is disposed on the edge portion of the mounting seat; a connecting cable, which can be wound around the spool piece; and a sensing element connected to the spool piece by the cable, where the sensing element and the housing are mounted on the rear fork, and the distance between the sensing element and the housing is adjustable by the cable.

For the instant disclosure, the sensor module utilizes the roll-up type sensing element adaptable to bicycles with different wheel sizes and rear forks. Various cycling parameters may thus be obtained. The retaining structure of the module can prevent the cable of the sensing element from accidentally retracting into the housing. Thereby, the length of the exposed cable may be effectively controlled to maintain aesthetic appeal. The tip portion of the cable is projected through the central portion of the spool, to prevent the cable from tying up due to repeated use in causing breakage of internal wires.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE EMBODIMENT

Unless otherwise specified, the number of parts disclosed in the embodiment is not restricted.

Figure 1:
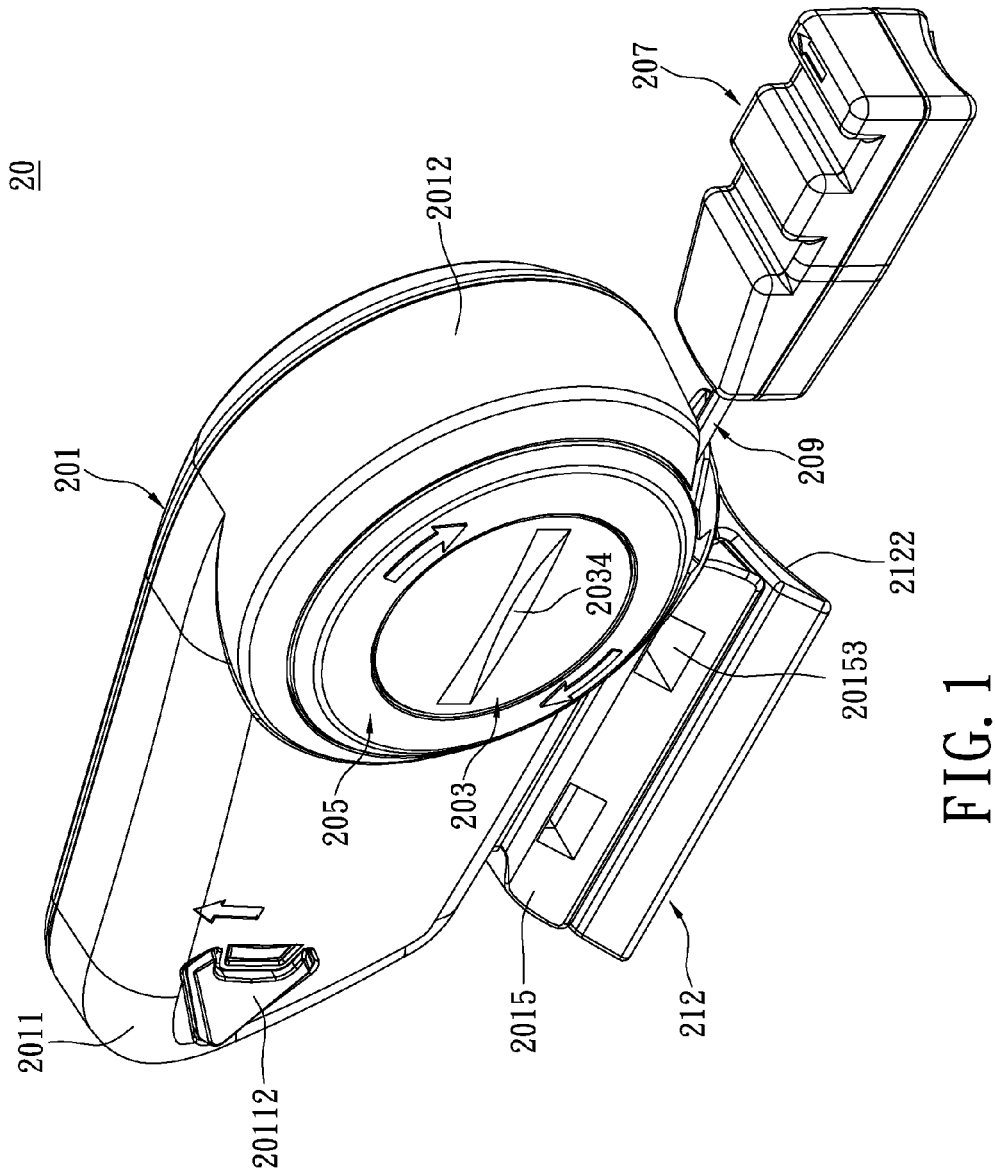
FIG. 1 is an assembled view of a sensor module for bicycle of the instant disclosure.
Figure 2:
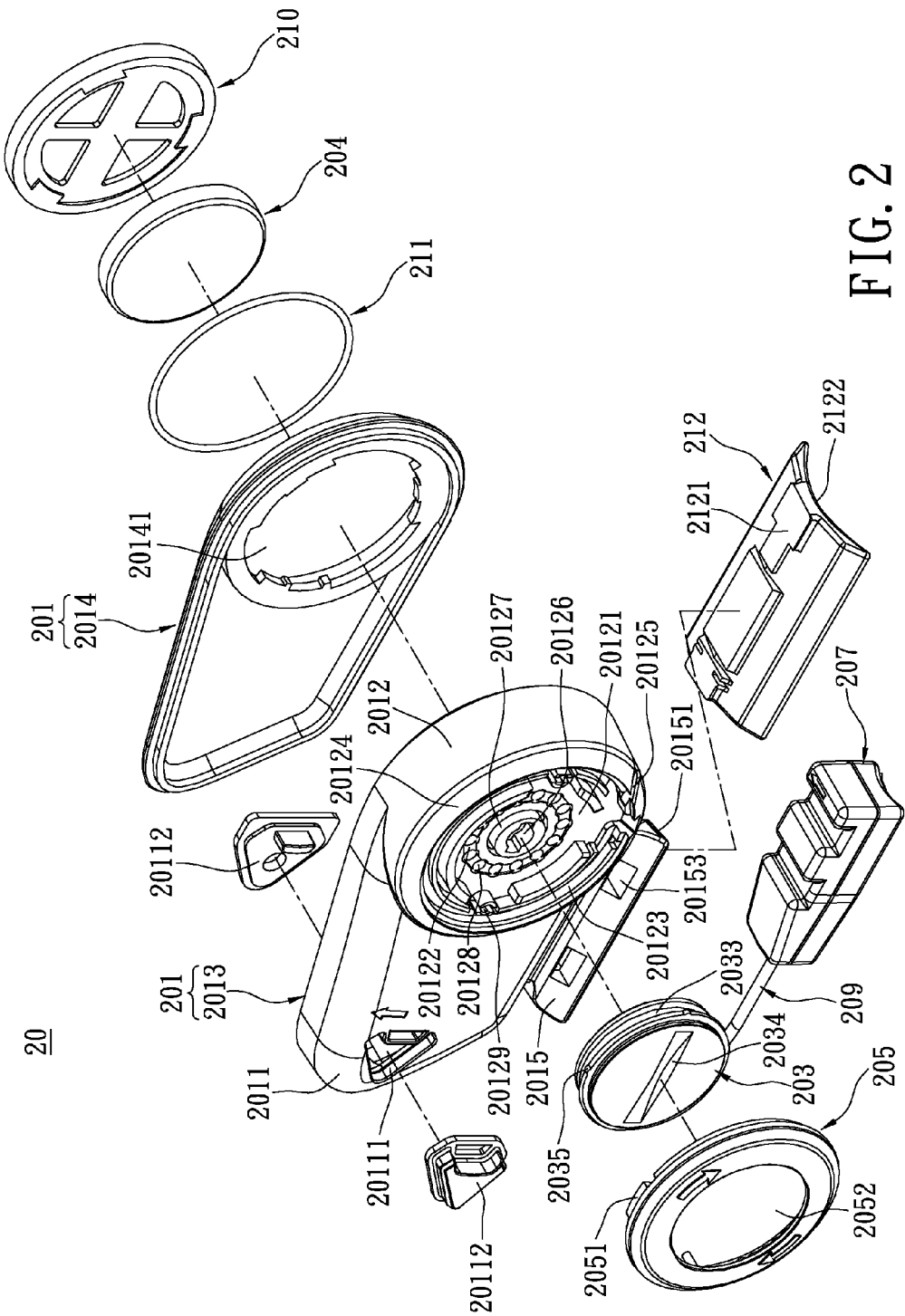
FIG. 2 is an exploded view of the sensor module in FIG. 1.
Figure 3:
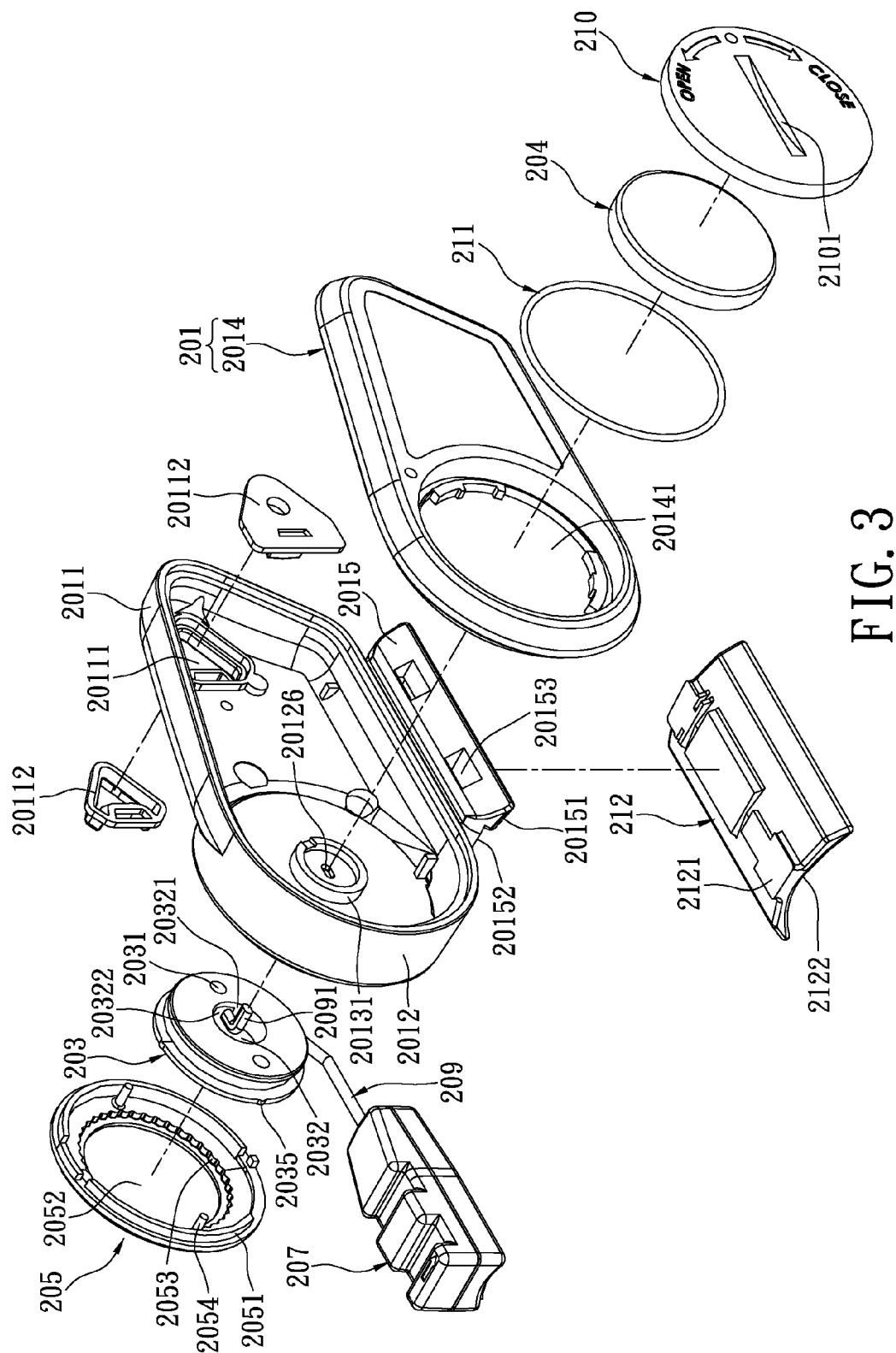
FIG. 3 is another exploded view of the sensor module in FIG. 1.
Figure 5:
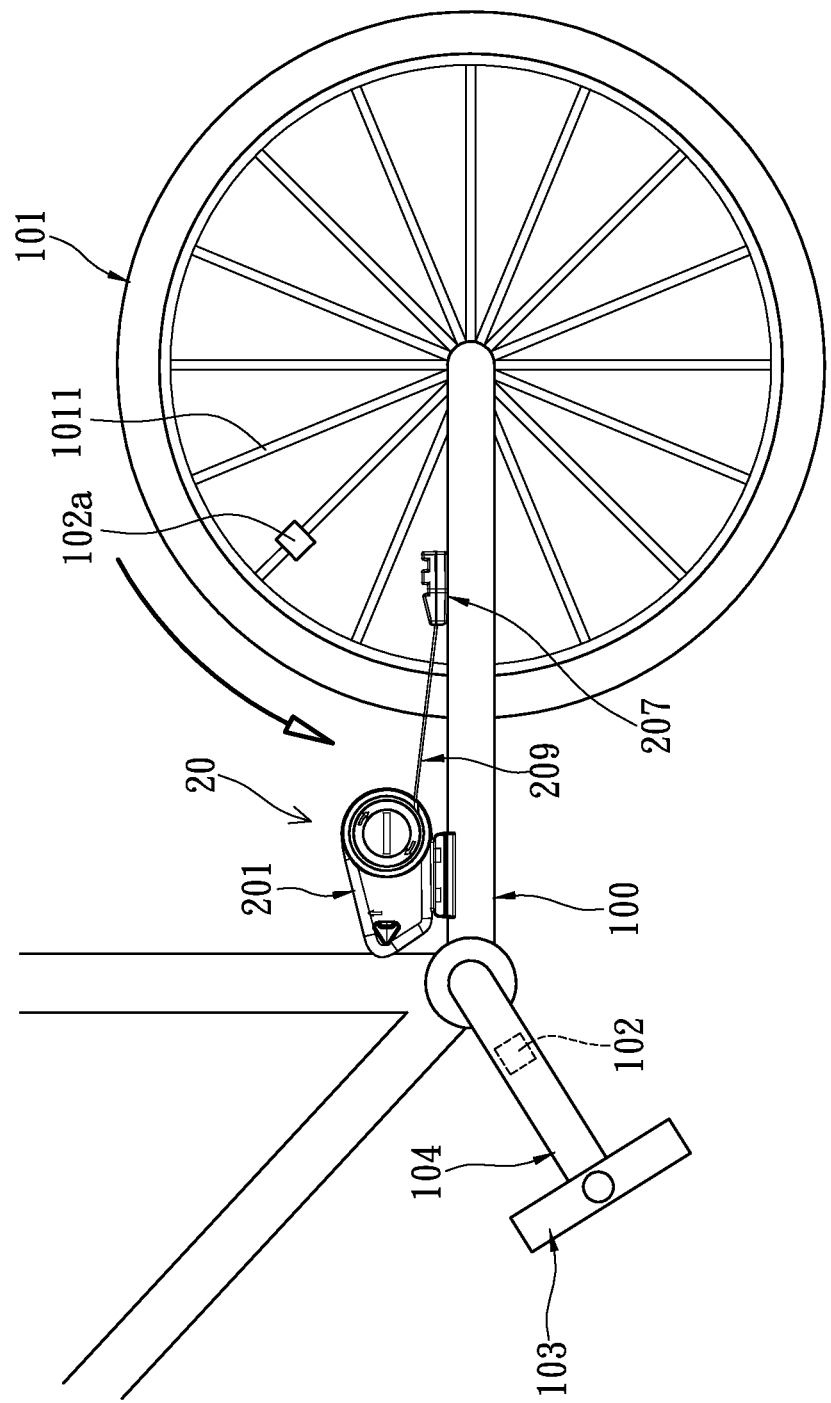
FIG. 5 is a side view of the sensor module in FIG. 1 mounted on a bicycle.

Please refer to FIGS. 1-3, which show a sensor module 20 of the instant disclosure for mounting on a rear fork 100 of a bicycle (as shown in FIG. 5). The sensor module 20 comprises a housing 201, a spool piece 203, a spool cap 205, a sensing element 207, and a connecting cable 209.

The housing 201 has an opposite first end 2011 and a second end 2012. A hole 20111, which is preferably triangle-shaped but not restricted thereto, is formed on the first end 2011 of the housing 201. An switch member 20112, which matches in shape with the hole 20111, is disposed on the first end 2011. The switch member 20112 is electrically connected to a printed circuit board (not shown) inside the housing 201. When the switch member 20112 is pressed, the sensor module 20 is reset for recalculating the cycling parameters.

A mounting seat 20121 is recessed on the second end 2012 and has a retaining structure 20122. A plurality of retaining holes 20128 is formed on the retaining structure 20122 and annularly arranged around the central portion of the mounting seat 20121.

The spool piece 203 is received by the mounting seat 20121. The spool piece 203 has at least one protrusion 2031 for engaging the retaining holes 20128. When the sensing element 207 is pulled away from the housing 201, the spool piece 203 is forced to turn axially. The rotating spool piece 203 enables the protrusion 2031 to engage the retaining holes 20128 in a clicking fashion.

The spool piece 203 further has at least one extension 2035 formed on the periphery thereof. The spool cap 205 has an opening 2052 and an engaging portion 2053 formed thereon. The engaging portion 2053 has a plurality of gear-like teeth arranged in a generally circular pattern. The engaging portion 2053 is arranged in proximity to the opening 2052. The extension 2035 engages the engaging portion 2053, with the engaging portion 2053 providing the same retaining effect as the retaining structure 20122.

The opening 2052 of the spool cap 205 is aligned correspondingly to the spool piece 203. The spool cap 205 is secured to the edge portion of the mounting seat 20121. A guide portion 2034 of the spool piece 203 away from the retaining holes 20128 is exposed through the opening 2052.

The spool cap 205 has at least one restricting member 2054, and the housing 201 has at least one retaining portion 20129 on the mounting seat 20121. The restricting member 2054 can selectively engage the retaining portion 20129. At least one guide slot 20123 is formed on the mounting seat 20121 adjacent to the edge portion thereof. The spool cap 205 has at least one rib 2051 arranged on the periphery thereof. When the spool piece 203 is disposed on the mounting seat 20121, the restricting member 2054 is engaged to the corresponding retaining portion 20129. Meanwhile, the rib 2051 of the spool cap 205 is engaged to the guide slot 20123 of the housing 201.

Figure 4:
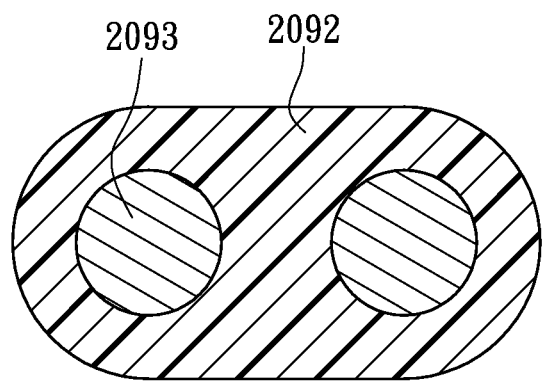
FIG. 4 is a cross-sectional view of a connecting cable of the sensor module in FIG. 1.

The sensing element 207 and the spool piece 203 are coupled by the connecting cable 209. As shown in FIG. 5, the sensing element 207 and the housing 201 are mounted on the rear fork 100. The cable 209 can be windingly received around the spool piece 203. The distance between the sensing element 207 and the housing 201 is adjustable by extending or retracting the cable 209, while without leaving any excess portion of the cable 209 hanging loosely outside. To be specific, as shown in FIG. 4, the cross-section of the cable 209 is preferably elliptical. Inner conductive wires 2093 are surrounded by a flexible insulating layer 2092. The insulating layer 2092 can be made with rubber material. The cable 209 with aforementioned features can be prevented from getting entangled and damaged, particularly after repeated extending/retracting of the cable 209 for the sensing element 207. Additionally, the cable 209 of the instant embodiment is integrally formed in one piece. Alternatively, the cable 209 can be constructed with multiple detachable sub-cables (not shown). For instance, the cable 209 may include two detachable sub-cables. One end of the first sub-cable is connected to the sensing element 207, while one end of the second sub-cable is connected to the spool piece 203. The two sub-cables can then be fused by a coupler. In other words, by removing the coupler, the sensing element 207 can be detached from the sensor module 20. The detachability provides greater convenience to the user while using the sensor module 20.

Please refer back to FIGS. 2-3. For the instant embodiment, the mounting seat 20121 is concavely formed on the second end 2012 of the housing 201 away from the spool cap 205. The mounting seat 20121 is defined by a substantially annular sidewall 20124. The sidewall 20124 is breached in forming a notch 20125. A portion of the cable 209 is passed through the notch 20125. When the sensing element 207 is adjusted away from or toward the housing 201, the cable 209 moves through the notch 20125. The notch 20125 is dimensionally compatible to allow smooth movement of the cable 209 therethrough.

The housing 201 has a through hole 20126 formed thereon on the central portion of the mounting seat 20121. The retaining holes 20128 are spaced evenly between each other and arrayed annularly around the through hole 20126. The retaining holes 20128 are preferably circular, but are not restricted thereto.

The spool piece 203 has a recess 2032 formed concavely on the central portion thereof. The recess 2032 is defined by a wall member 20321 and faces toward the through hole 20126. The wall member 20321 has an access hole 20322 projected therethrough. A tip portion 2091 of the cable 209 passes through the access hole 20322 into the central region of the spool piece 203.

The spool piece 203 further has a storage slot 2033 concavely formed thereon annularly for accommodating a portion of the cable 209.

Moreover, the spool piece 203 further has a concave guide portion 2034. An object, such as a coin, which fits matchingly inside the guide portion 2034, can be inserted therein to turn the spool piece 203 in a clockwise or counter-clockwise direction. The axis of rotation is defined by the longitudinal axis of the through hole 20126. Thereby, the cable 209 can be retracted and stored in the storage slot 2033 with ease.

Please refer to FIG. 5 in conjunction with FIGS. 2 and 3. Not shown in the figures, a reed switch sensor is arranged on the housing 201 adjacent to the switch member 20112, while another reed switch sensor is arranged on the sensing element 207. For the instant embodiment, a magnet 102a is attached to a spoke 1011 of a rear wheel 101 of a bicycle. When the rear wheel 101 turns, the magnetic reed switch of the sensing element 207 is actuated briefly each time the magnet 102a on the wheel 101 passes by. The switch signal is read by a cycling computer to calculate various parameters such as speed, distance traveled, etc. Furthermore, a pedal 103 and a rear fork 100 are interconnected by a crank arm 104. The crank arm 104 carries a magnet 102 thereon. Similarly, when the pedal 103 rotates, the magnetic reed switch adjacent to the reset switch 20112 is actuated by the magnet 102 on the crank arm 104. The switch signal is used to determine the pedaling speed and efficiency.

The sensor module 20 includes a wireless transmitter (not shown) arranged on a circuit board inside the housing 201. Thereby, the trip information collected by the sensor module 20 can be transmitted to the wireless receiver module (not shown) arranged on the handlebar of the bicycle. The collected cycling data can then be shown through a display interface of the wireless receiver module. Since the wireless data exchange is a commonly used technique, no further descriptions are provided herein.

Please refer back to FIGS. 2 and 3. A protruding member 20127 is arranged centrally on the mounting seat 20121. The protruding member 20127 projects correspondingly into the recess 2032 of the spool piece 203. The housing 201 includes a first shell 2013 and a second shell 2014.

The first and second shells 2013, 2014 are adjoined to one another. The mounting seat 20121 is arranged on the second end 2012 of the first shell 2013. A flanged portion 20131 is formed on the first shell 2013 opposite of the protruding member 20127. The through hole 20126 is projected through the protruding member 20127.

The tip portion 2091 of the cable 209 passes through the through hole 20126, with a portion of the cable 209 passes the through hole 20126. To be more specific, when the cable 209 is being rewound into the storage slot 2033 of the spool piece 203, the tip portion 2091 of the cable 209 passes through the access hole 20322 of the recess 2032. The tip portion 2091 continues to pass through the through hole 20126 of the first shell 2013, and is fixed inside the flanged portion 20131 by adhesives. Thus, the tip portion 2091 of the cable 209 is securely fixed inside the housing 201 and is waterproof.

The second shell 2014 has an accommodating opening 20141 formed thereon for accommodating at least one power supply unit 204 (i.e., battery). The power supply unit 204 powers the sensor module 20 to operate. In addition, a printed circuit board (not shown) is arranged between the first and second shells 2013, 2014. The power supply unit 204, the switch member 20112, and the tip portion 2091 of the cable 209 that passes through the flanged portion 20131 are electrically connected to the printed circuit board. The aforementioned electrical connection is a commonly used technique, therefore no further description is given herein.

The instant embodiment further comprises a battery cap 210 and a leak-proof O-ring 211. The O-ring 211 is supported at the inner wall that defines the accommodating opening 20141, and the battery cap 210 is removably engaged on the second shell 2014 corresponding to the power supply unit 204. After the O-ring 211 has mated with the battery cap 210 to form a seal, water infiltration can be prevented. In other words, during rainy condition or when water is splashed on the sensor module 20, water can be kept from entering the sensor module 20 thereby preventing damage or short-circuit. The battery cap 210 is detachably mounted on the surface that defines the accommodating opening 20141 of the second shell 2014. The battery cap 210 further has a recessed portion 2101 for dismounting the battery cap 210 to replace the power supply unit 204.

For the instant embodiment, the housing 201 includes a base 2015 attached to the first shell 2013. The base 2015 has a locking surface 20151, where at least one locking channel 20152 is formed on the locking surface 20151.

The sensor module 20 further includes a holder 212. The holder has at least one engaging member 2121 corresponding to the locking channel 20152. The engaging member 2121 and the locking channel 20152 work cooperatively in allowing the holder 212 to removably connect with the base 2015 of the housing 201. The holder 212, in particular, has an arched surface 2122 opposite of the engaging member 2121. The arched surface 2122 allows the sensor module 20 to fit onto the rod-shaped rear fork 100 (FIG. 5).

Please refer to FIG. 5 in conjunction with FIGS. 2 and 3. After the holder 212 is assembled to the base 2015 of the housing 201, a fastening member, such as cable ties (not shown), can be passed through at least one securing hole 20153 formed on the base 2015, to bind the sensor module 20 on the rear fork 100.

With reference to FIGS. 2, 3 and 5, the use of the sensor module 20 is further explained herein below.

First, the engaging member 2121 of the holder 22 is secured to the locking channel 20152 of the base 2015.

Next, magnets 102, 102a are disposed on the crank arm 104 and the spoke 1011, respectively.

Then, the arched surface 2122 of the holder 212 is disposed against the rear fork 100. Fastening elements, such as cable ties, may be passed through the securing hole 20153 of the base 2015, to bind the housing 201 of the sensor module 20 around the rear fork 100. During the initial setup, the crank arm 104 is preferably aligned parallel to the housing 201. The alignment allows the magnetic reed switch beside the switch member 20112 and the magnet 102 on the crank arm 104 to establish a stable magnetic interaction therebetween. The sensing element 207 has at least one securing groove (not shown) formed thereon for receiving the cable tie to bind the sensing element 207 on the rear fork 100.

Once the sensing element 207 has been secured to the rear fork 100, the magnetic reed switch inside the sensing element 207 can interact magnetically with the magnet 102a on the spoke 1011.

Lastly, slack portions of the cable 209 between the housing 201 and the sensing element 207 are retracted into the storage slot 2033 of the spool piece 203. Thereby, no loose cable will be dangling between the housing 201 and the sensing element 207. Furthermore, the protrusion 2031 of the spool piece 203 and the retaining holes 20128 of the housing 201 work cooperatively to increase the stability of the cable 209 under operation (such as preventing the cable 209 from accidentally retracts or extends when riding the bicycle).

Once the sensor module 20 has been installed to the bicycle, the magnetic reed switches of the housing 201 and the sensing element 207 operate magnetically with the magnet 102 of the crank arm 104 and the magnet 102a of the spoke 1011, respectively. Various parameters, such as pedaling efficiency and speed, may be collected by the sensor module 20 and fed wirelessly to the handlebar mounted display. The user can simply look at the display to access the trip information.

In summary, the sensor module of the instant disclosure enables the user to arbitrarily adjust the distance between the housing and the sensing element through the connecting cable. This flexibility allows the sensor module to be adoptable by bicycles with different wheel sizes and rear fork structures. Accordingly, different cycling parameters can thus be measured. As a precautionary measure, the retaining structure of the module can effectively prevent the extended cable from retracting accidentally into the housing. The control of the cable length also enhances the aesthetic aspect of the sensor module. Moreover, the projection of the tip portion of the cable through the central portion of the spool piece is advantageous. Namely, the cable can be kept from tying up to prevent breakage of internal electric wires after repeated pulling and retracting of the sensing element.

The descriptions illustrated supra set forth simply the preferred embodiment of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A sensor module, for mounting on a rear fork of a bicycle, comprising:
    a housing having an opposite first end and a second end,
        wherein a switch member is arranged on the first end and a mounting seat is recessed on the second end,
        wherein a retaining structure is arranged on the mounting seat,
        wherein the retaining structure has a plurality of retaining holes formed thereon;
    a spool piece arranged on the mounting seat, wherein the spool piece has at least one protrusion for engaging the retaining holes;
    a spool cap having an opening formed thereon for exposing the spool piece,
        wherein the spool cap is mounted on the edge portion of the mounting seat;
    a cable capable of being rewound into the spool piece; and
    a sensing element connected to the spool piece through the cable,
        wherein the sensing element and the housing are mounted on the rear fork of the bicycle, with the distance between the sensing element and the housing being adjustable by the windable cable.

2. The sensor module of claim 1, wherein the mounting seat has an annular sidewall, and wherein the sidewall has a notch enabling the cable to pass therethrough.

3. The sensor module of claim 1, wherein the spool piece has at least one extension arranged peripherally thereon, wherein the spool cap has a gear teeth-like engaging portion adjacent to the opening toward the spool piece, and wherein the extension engages the engaging portion.

4. The sensor module of claim 1, wherein a substantially annular storage slot is formed concavely on the spool piece capable of storing the cable, wherein a through hole is formed centrally on the mounting seat, and wherein the retaining holes are equally spaced from each other around the through hole.

5. The sensor module of claim 4, wherein a recess is formed concavely and centrally on the spool piece, wherein the recess is defined by a wall member and faces toward the through hole, and wherein the wall member has an access hole formed thereon for projecting a tip portion of the cable therethrough.

6. The sensor module of claim 5, wherein the mounting seat has a central protruding member for inserting correspondingly into the recess of the spool piece, wherein the housing includes a first shell and a second shell mutually engaged to one another, wherein the mounting seat is arranged on the first shell and a flanged portion is disposed on the first shell opposite of the through hole.

7. The sensor module of claim 1, wherein the cable is an integrally formed unit.

8. The sensor module of claim 1, wherein the cable is detachably constructed.

* * * * *